US011988361B2

(12) United States Patent
Riehl et al.

(10) Patent No.: US 11,988,361 B2
(45) Date of Patent: May 21, 2024

(54) JOINING SEMI-RIGID FIBROUS PANELS

(71) Applicant: Sabin, LLC, Chicago, IL (US)

(72) Inventors: Samuel Riehl, Chicago, IL (US); Lucas Baird, Chicago, IL (US); Wes Cox, Chicago, IL (US)

(73) Assignee: SABIN, LLC, Chicago, IL (US)

(*) Notice: Subject to any disclaimer, the term of this patent is extended or adjusted under 35 U.S.C. 154(b) by 0 days.

(21) Appl. No.: 18/319,973

(22) Filed: May 18, 2023

(65) Prior Publication Data

US 2023/0375162 A1 Nov. 23, 2023

Related U.S. Application Data

(60) Provisional application No. 63/343,418, filed on May 18, 2022.

(51) Int. Cl.

| | |
|---|---|
| ***F21V 1/06*** | (2006.01) |
| ***F21V 1/08*** | (2006.01) |
| ***F21V 15/01*** | (2006.01) |

(52) U.S. Cl.

CPC .............. *F21V 15/012* (2013.01); *F21V 1/06* (2013.01); *F21V 1/08* (2013.01)

(58) Field of Classification Search

CPC ............. F21V 1/06; F21V 1/08; F21V 15/012

See application file for complete search history.

(56) References Cited

U.S. PATENT DOCUMENTS 2,871,598 A * 2/1959 Pawelka ................ G09F 13/00 40/571

5,607,451 A * 3/1997 Menocal, Jr. .......... A61B 17/30 294/99.2

* cited by examiner

*Primary Examiner* — Sean P Gramling

(74) *Attorney, Agent, or Firm* — Leydig, Voit & Mayer, Ltd.

(57) ABSTRACT

Embodiments disclosed herein describe a semi-rigid fibrous structure. The semi-rigid fibrous structure contains a first semi-rigid fibrous body comprising a first living hinge; a second semi-rigid fibrous body comprising a second living hinge; and a rotatable joint formed at a bond between the first semi-rigid fibrous body and the second semi-rigid fibrous body proximate the first living hinge and the second living hinge.

7 Claims, 7 Drawing Sheets

JOINING SEMI-RIGID FIBROUS PANELS

CROSS-REFERENCE TO RELATED APPLICATIONS

This patent application claims the benefit of U.S. Provisional Patent Application No. 63/343,418, filed May 18, 2022, which is incorporated by reference.

BACKGROUND

When joining two or more separate structures together to form single structure, the two or more separate structures are typically joined together at a joint. The joint connecting the two structures must provide structural rigidity sufficient to meet the needs of the composite structure once the components are joined. For example, in the acoustic lighting industry, a typical lighting fixture is formed from sheet metal and joined together with fasteners at a joint. Once the metal structure is formed, adhesive and/or fasteners/hardware is used to apply sound dampening material to the metal structure in order to provide the desired acoustic properties of the lighting fixture. However, the use of adhesives and/or fasteners/hardware is unreliable, and the use of rigid structures such as metal or wood is not desirable in that they add weight and cost to the structure without the needed acoustic properties.

Therefore, the use of non-rigid materials is desirable, but working with non-rigid materials is mechanically difficult. For instance, mechanically joining two pieces of semi-rigid fibrous panel to satisfy pressure/tensioning, strength, and aesthetics is a difficult task. Typical methods such as adhesive and sheet metal plus fasteners lack the necessary strength to hold parts over time and they create uneven pressures and/or deformation of the material. Further, legacy methods also include the addition of tertiary materials and processes that further complicate the process and increase the potential for failure and/or human error.

BRIEF DESCRIPTION OF THE SEVERAL VIEWS OF THE DRAWING(S)

Figure 3A:
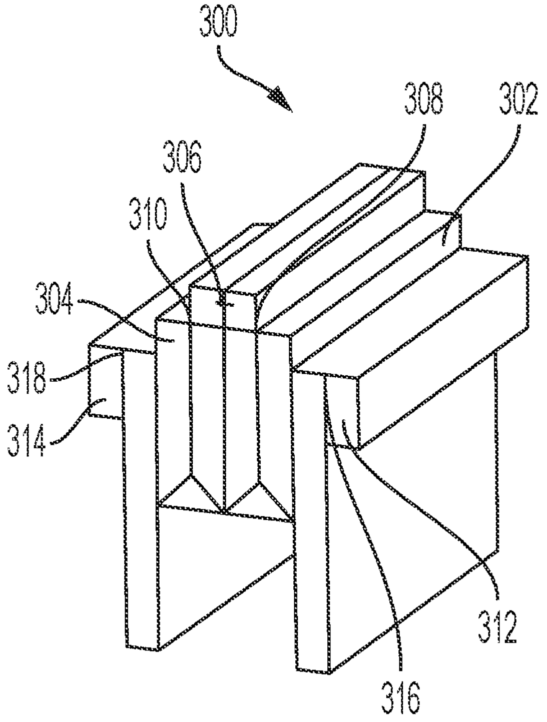
Figure 3B:
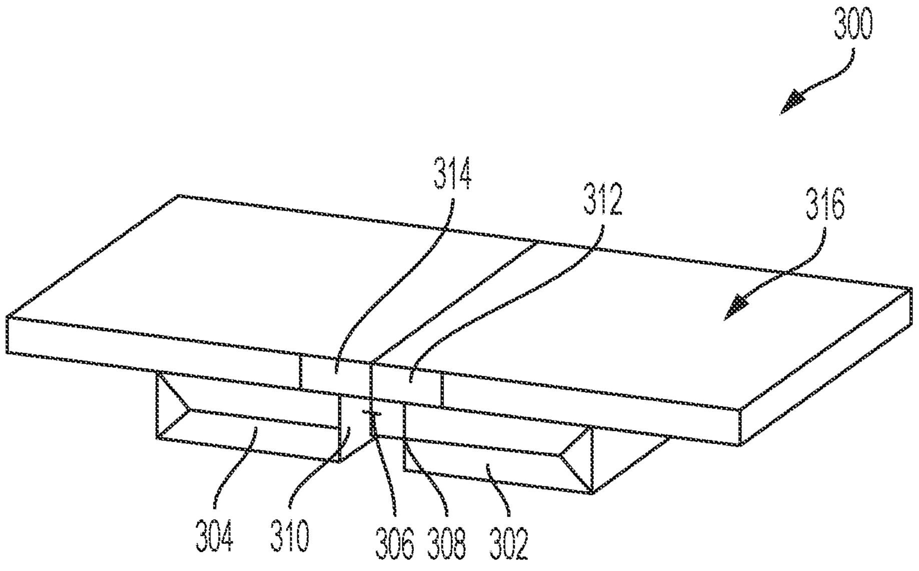
Figure 4A:
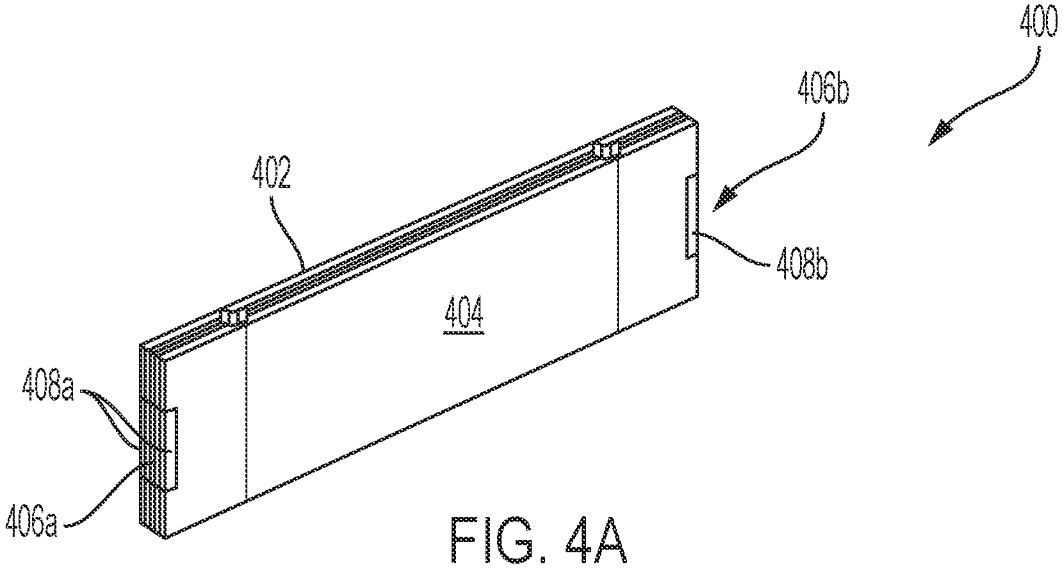
Figure 4B:
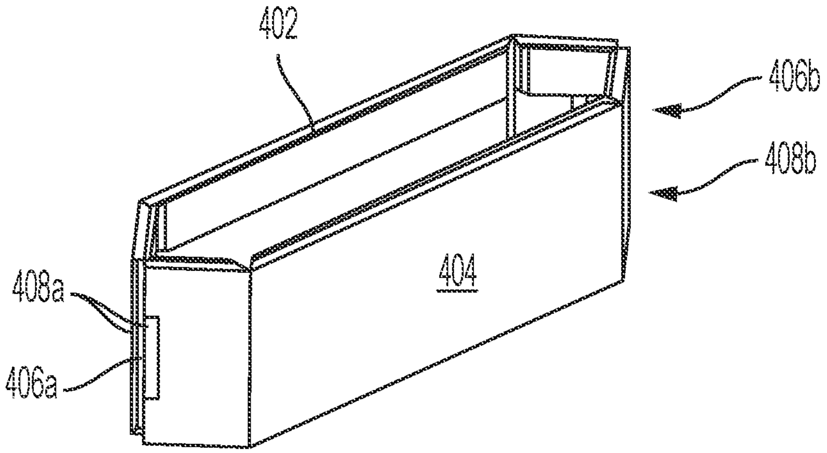
Figure 4C:
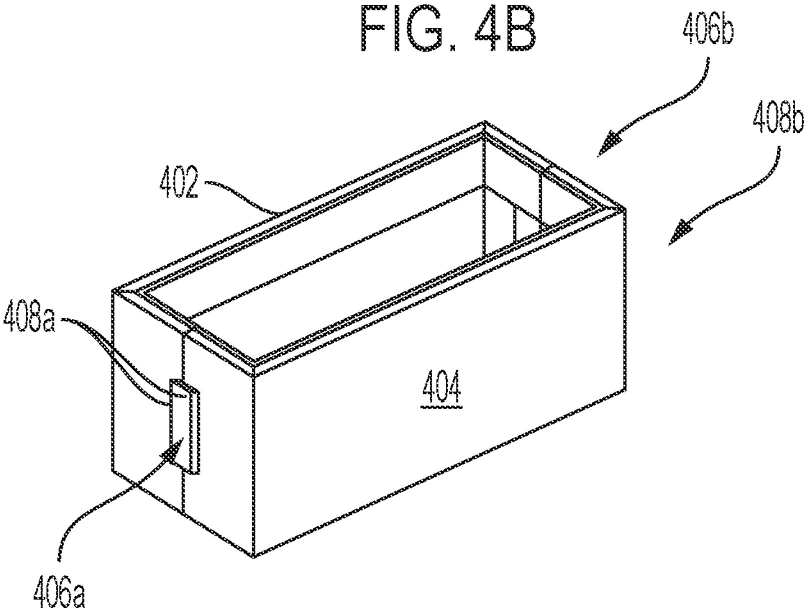
Figure 5:
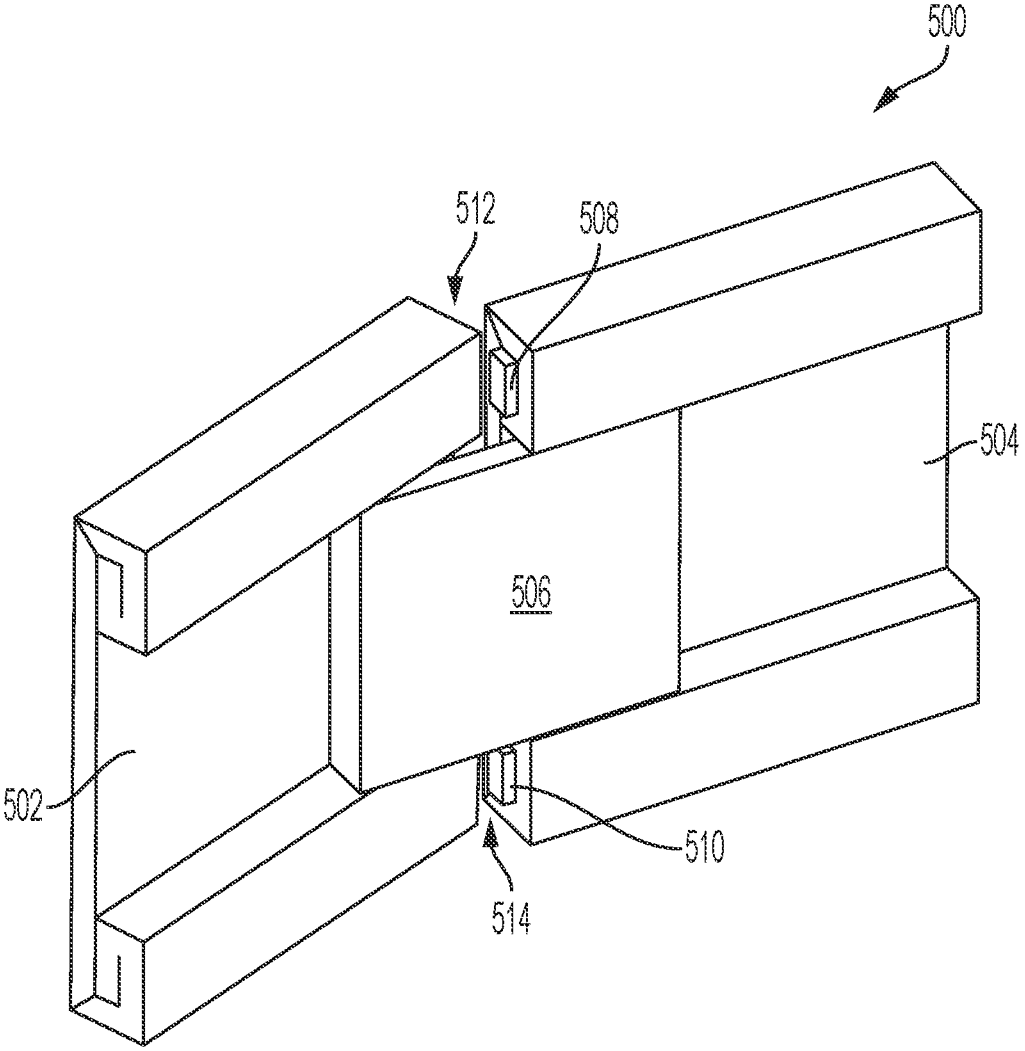
Figure 6:
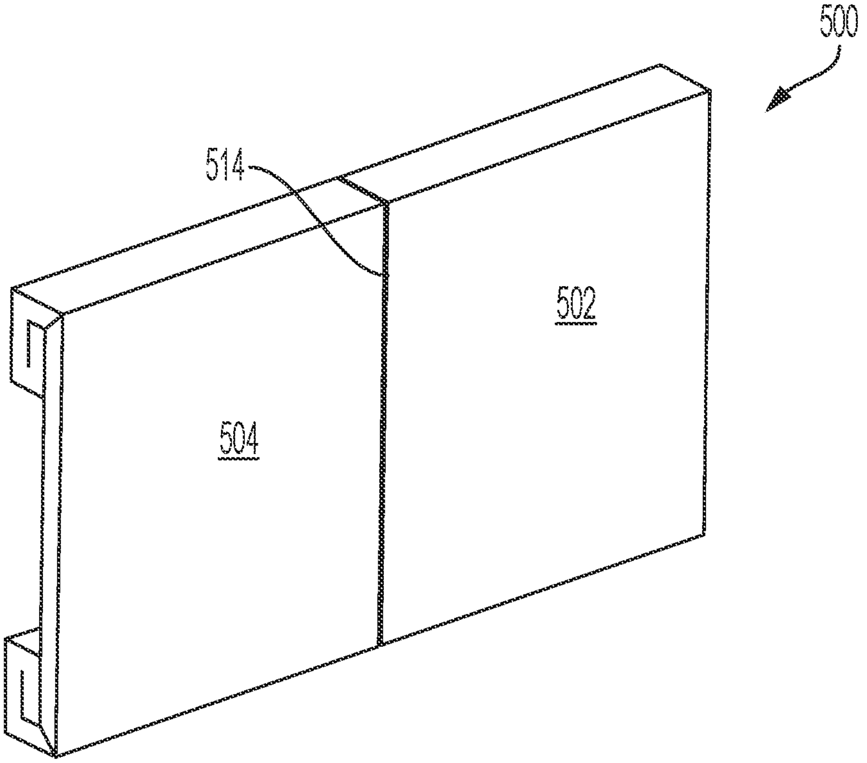

FIGS. 3*a* and 3*b* illustrate a joint between two semi-rigid fibrous bodies in an open and closed state, in accordance with embodiments of the disclosure;

FIGS. 4*a*, 4*b*, and 4*c* illustrate foldable structure formed from joining two semi-rigid fibrous bodies, in accordance with embodiments of the disclosure;

FIG. 5 illustrates a joint between two semi-rigid fibrous bodies, in accordance with embodiments of the disclosure;

FIG. 6 illustrates the joint of FIG. 5 in a closed state; and

Figure 7:
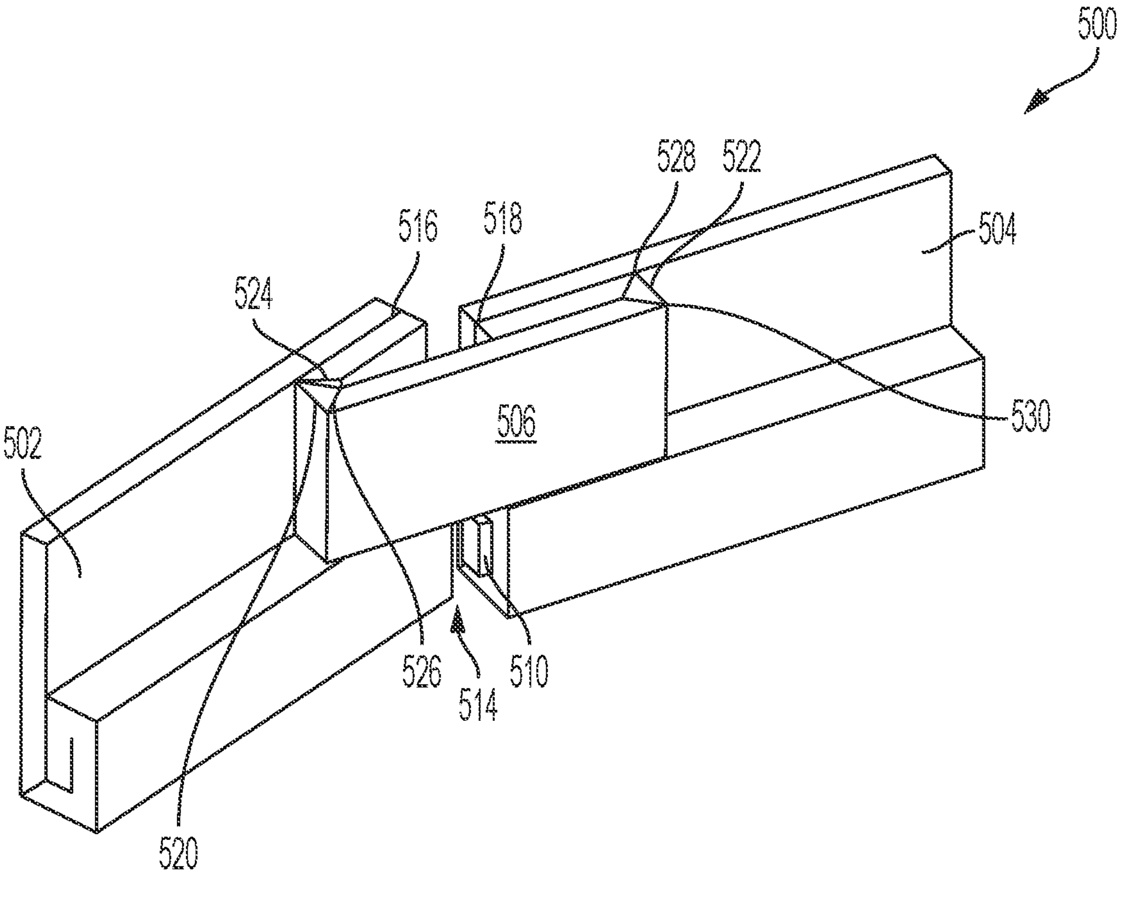

FIG. 7 illustrates a perspective lengthwise cross-sectional view of the joint of FIG. 5.

DETAILED DESCRIPTION OF THE INVENTION

Embodiments of the present disclosure provide scalable techniques for joining two semi-rigid fibrous bodies. These techniques rely on a combination of relief cutting, folding, and sewing/bonding to produce an architecture which satisfies the needed strength, tensioning, and final aesthetics that characterize a well-made joint/connection. The aforementioned joints focus on bringing together two independent semi-rigid fibrous bodies, each with their own respective planar faces so to create one final assembly with a visually homogenous, planar face. To clarify, the two fibrous bodies are joined such that an outside surface of the two bodies joined into a single structure, when in a close state, are coplanar. The resulting coplanar face is physically and visually of a single plane. While the embodiments of the disclosure provided herein reference this coplanar face formed between the two joined bodies, the invention stands regardless of part/face planarity relative to any other part/face. As such, in certain embodiments, the flat appearance of the outside surface, when the joint is in the closed state, does not have to appear flat. For instance, an acute angle may be formed between two mating parts (i.e., exterior faces creating the acute angle) thereby creating a final form that is not planar.

Figure 1:
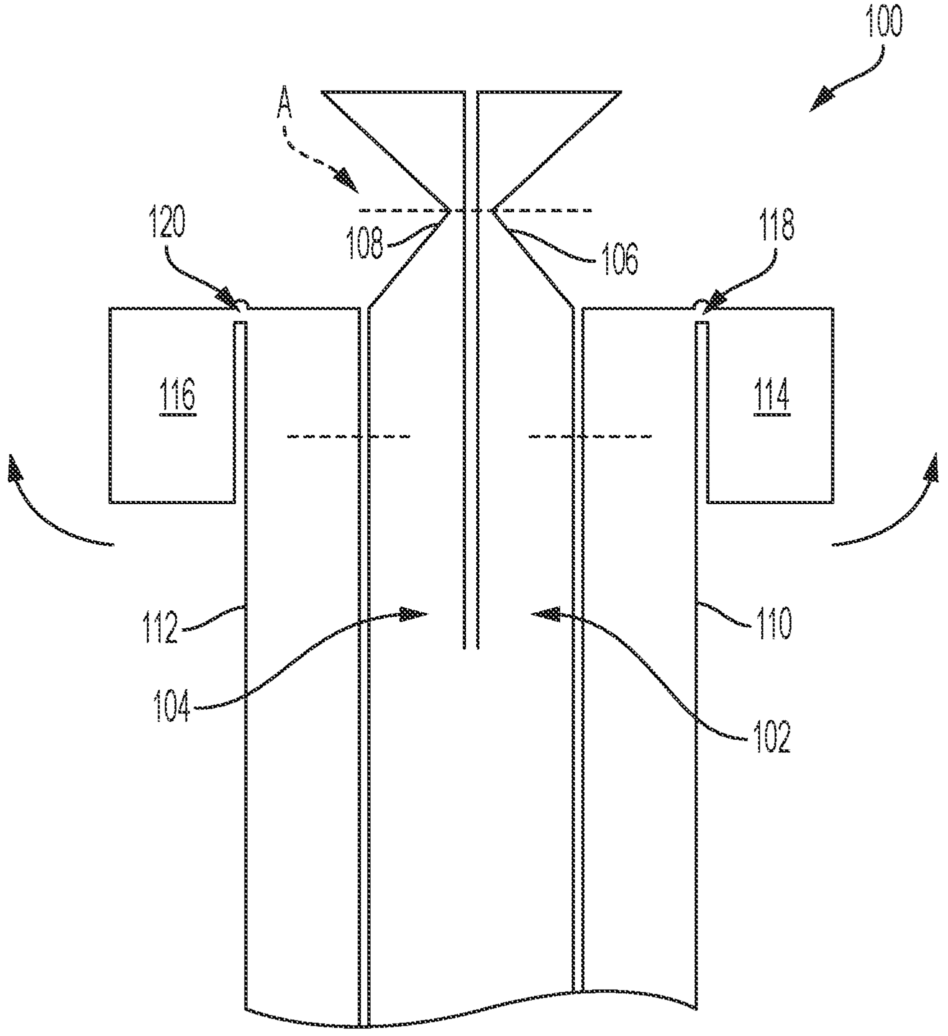
FIG. 1 illustrates a joint between two semi-rigid fibrous bodies, in accordance with embodiments of the disclosure.
Figure 2:
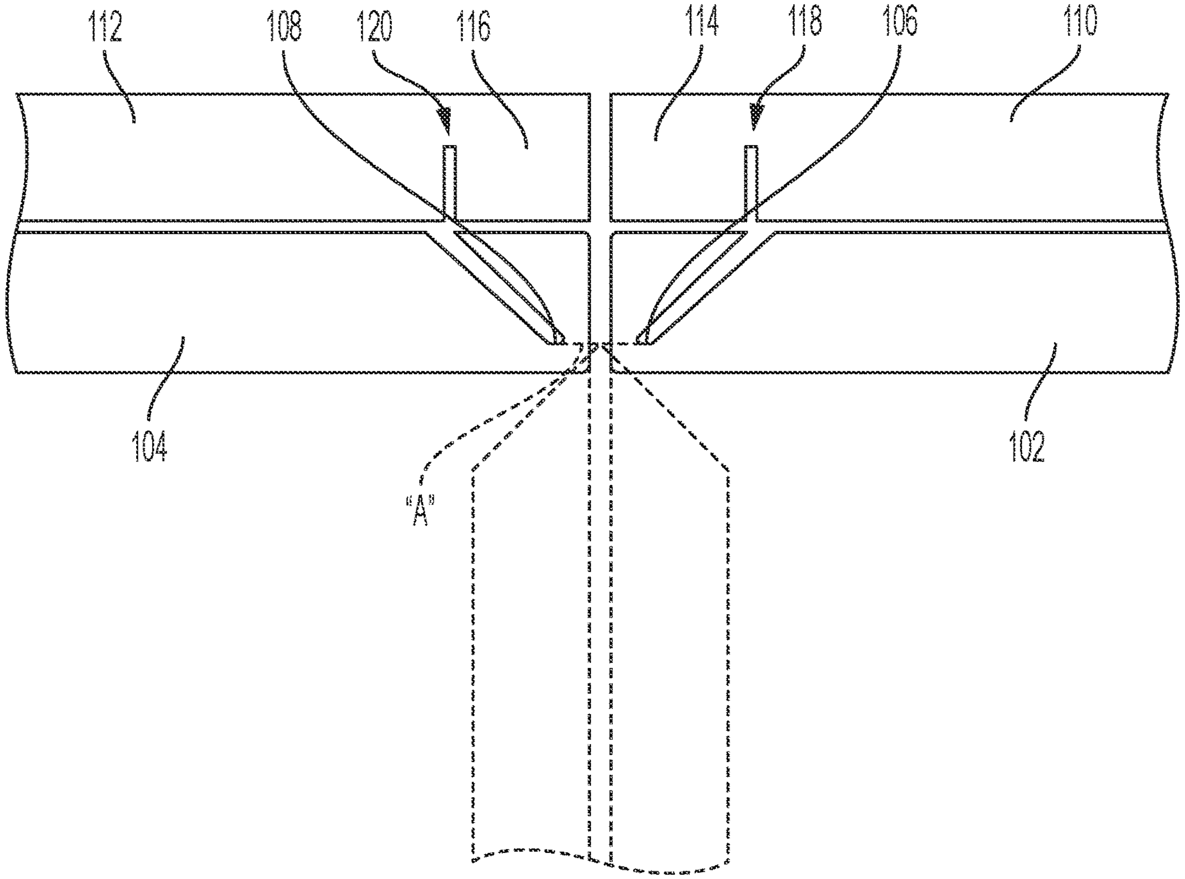
FIG. 2 illustrates the joint of FIG. 1 in a closed condition.

FIG. 1 illustrates a first technique for joining two semi-rigid fibrous bodies 102 and 104 to form a single joined semi-rigid fibrous body 100. As shown, each semi-rigid fibrous body 102 and 104 contain "V" shaped reliefs/grooves 106 and 108 down their respective lengths. These grooves act as living hinges along which the respective two semi-rigid fibrous bodies 102 and 104 can fold. The two semi-rigid fibrous bodies 102 and 104 are then mated to each other such that the "V" shaped reliefs/grooves 106 and 108 are roughly symmetric about the mating faces at point "A" where the apex of the "V" shaped reliefs/grooves 106 and 108 are nearest each other. This resulting stack up is then sewn/bonded down the length of the apexes. When the "V" shaped reliefs/grooves 106 and 108 are folded to the allowable extent of each living hinge, the resulting connection/joint can be characterized as well-made. FIG. 2 illustrates an up-close view of the living hinge formed from the "V" shaped reliefs/grooves 106 and 108 when in a closed state. In certain embodiments, additional "V" shaped reliefs and/or partial depth incisions may be required to reach the aesthetic requirements of the product.

The joined semi-rigid fibrous body 100 can be in an open or close state. FIG. 1 illustrates the joined semi-rigid fibrous body 100 in an open state. When the two semi-rigid fibrous bodies 102 and 104 are rotated about the living hinge formed by the sewing/bonding of the "V" shaped reliefs/grooves 106 and 108, the joined semi-rigid fibrous body 100 will then be in a closed state. Such a closed state for the joined semi-rigid body 100 is shown in FIG. 2. As illustrated, outside surfaces 110 and 112 of the two semi-rigid fibrous bodies 102 and 104 when rotated about the living hinge formed by the "V" shaped reliefs/grooves 106 and 108 are coplanar. Therefore, when the joined semi-rigid fibrous body 100 is in a closed state, the outside surfaces 110 and 112 of the two semi-rigid fibrous bodies 102 and 104 are coplanar. In this manner, a flat outside surface is formed between the two semi-rigid fibrous bodies 102 and 104 when the joined semi-rigid fibrous body 100 is in a closed state.

FIG. 2 further illustrates, seam access flaps 114 and 116. Seam access flaps 114 and 116 are formed by making partial depth incisions 118 and 120 in the end portions of each of the two semi-rigid fibrous bodies 102 and 104 that form the outside surface of the joined semi-rigid fibrous body 100. The partial depth incisions 118 and 120 form living hinges that allow the external seam created at "A" when the two semi-rigid fibrous bodies 102 and 104 are joined to be hidden from the outside by closing the seam access flaps 114 and 116. However, the seam created at "A" can still be accessed by opening the seam access flaps 114 and 116 at the partial depth incisions 118 and 120 to expose the seam. In this manner, a flat outside surface appearance is formed on the joined semi-rigid fibrous body 100 even though the seam at "A" is on the outside of the joined semi-rigid fibrous body 100.

As an aside, while the illustrated embodiment shows the seam access flaps 114 and 116, these structures are not required. Accordingly, in certain embodiments, the joined semi-rigid fibrous body 100, when in a close state, may have the seam created at "A" visible from the outside yet still have sufficient structural integrity.

FIG. 3*a* illustrates a single joined semi-rigid fibrous body 300 in an open state, and FIG. 3*b* illustrates the single joined semi-rigid fibrous body 300 in a closed state. The single joined semi-rigid fibrous body 300 includes two semi-rigid fibrous bodies 302 and 304 that contain partial depth incisions 308 and 310 down their respective lengths. These incisions act as living hinges along which the respective parts can fold. The two semi-rigid fibrous bodies 302 and 304 are then mated to each other along their lengths at 306 such that incisions 308 and 310 are roughly symmetric about the mating faces where the deepest point of incisions 308 and 310 are furthest from each other. This resulting stack up is then sewn/bonded down its length at 306.

FIG. 3*a* further illustrates seam access flaps 312 and 314. The seam access flaps 312 and 314 are created by making partial depth incisions 316 and 318 at the end portion of each of the two semi-rigid fibrous bodies 302 and 304 to create a living hinge at incisions 316 and 318. In this manner, the seam access flaps 312 and 314 may be actuated to open or close in order to hide or expose the seam created at 306 when the single joined semi-rigid fibrous body 300 is in a closed state.

FIG. 3*b* illustrates the single joined semi-rigid fibrous body 300 in the closed state. In this state, the two semi-rigid fibrous bodies 302 and 304 are rotated to the closed state and the seam access flaps 312 and 314 are closed so to obscure the seam at length 306. In this condition, a flat exterior surface 316 is created where the seam at length 306 is both hidden and accessible by the seam access flaps 312 and 314.

With respect to both techniques illustrated in FIGS. 1-3, when used in tandem with additional "V" shaped reliefs and/or partial depth incisions enable construction of a 3-dimensional closed profile with a hidden exterior seam and capable of being flattened when the joined bodies are in an open state. Specifically, a 3-dimensional closed profile body may be flattened via the living hinges, and, when actuated to their fullest extent, a width of the 3-dimensional closed profile body is minimized by a considerable degree.

FIGS. 4*a*-4*c* illustrate a 3-dimensional closed profile structure 400 formed from joining two semi-rigid fibrous bodies 402 and 404. The two semi-rigid fibrous bodies 402 and 404 are joined at both ends of the structure 400 at joints 406*a* and 406*b* via one or more of the techniques discussed above regarding FIGS. 1-3. FIG. 4*a* illustrates the 3-dimensional closed profile structure 400 in a flat state where both joints 406*a* and 406*b* are in an open state. In the flat state, structure 400 maintains a limited profile that may be beneficial when shipping the structure in order to take up a limited space during shipping. FIG. 4*b* illustrates the structure 400 when the joints 406*a* and 406*b* are in a partially closed yet still slightly open state. FIG. 4*b* illustrates how when closing the joints 406*a* and 406*b* the two ends of the structure 400 are moved inward to begin forming a box like structure as shown in FIG. 4*c*. FIG. 4*c* illustrates the structure 400 where the joints 406*a* and 406*b* are in a closed state. As shown, in the close state, structure 400 forms a rectangular box where the joints 406*a* and 406*b* are on an outside of the structure 400 yet obscured by seam access flaps 408*a* and 408*b* to form a flat appearance to the rectangular box of structure 400.

As described, the structure 400 expands into a box with a variety of applications. In a particular embodiment, structure 400 may support lighting elements (e.g., Light Emitting Diodes) to enable the structure 400 to be used as a lighting fixture. In this embodiment, the lighting fixture may contain the lighting elements on the inside of structure 400 while maintaining the flat clean outside aesthetic appearance. In this condition, the structure 400 may be suspended from a ceiling in an environment where it is installed. Further, because the structure 400 is made from semi-rigid fibrous material, the structure 400 will have advantageous acoustic properties. Due to these advantageous acoustic properties, a lighting fixture made using structure 400 may be beneficially used for acoustic lighting purposes. Moreover, when shipping the structure 400 prior to installing it as an acoustic lighting fixture, structure 400 can be collapsed in order to take up minimal space during shipping.

FIG. 5 illustrates another embodiment for joining two semi-rigid fibrous bodies 502 and 504 to form a single joined semi-rigid fibrous body 500. As illustrated, the single joined semi-rigid fibrous body 500 is joined by an attachment member 506. The attachment member 506 is formed from semi-rigid fibrous panel. In the illustrated embodiment, the bodies 502 and 504 are joined to the attachment member 506 by sewing or bonding (i.e., with an adhesive or with mechanical fasteners) portions of the attachment member 506 to bodies 502 and 504, respectively (shown in more detail in FIG. 7). The attachment portion 506 is then cut with a combination of "V" cuts and/or partial through cuts (also shown in more detail subsequently in FIG. 7) in order to fold the attachment portion 506 to join bodies 502 and 504.

In certain embodiments, the bodies 502 and 504 and the attachment member 506 may be formed from a single piece of semi-rigid fibrous panel, where portions of the semi-rigid fibrous panel are cutout from above and below the attachment portion such that the attachment portion is narrower than the bodies 502 and 504. The attachment portion 506 would then cut with a combination of "V" cuts and/or partial through cuts in order to fold the attachment portion 506 to join bodies 502 and 504.

Returning to the illustrated embodiment of FIG. 7, the single joined semi-rigid fibrous body 500 further includes alignment tabs 508 and 510. The alignment tabs 508 and 510 are located at semi-rigid fibrous body 504. Corresponding cutouts 512 and 514 (not illustrated) are provided on semi-rigid fibrous body 502. The cutouts 512 and 514 are reciprocal to the alignment tabs 508 and 510, respectively. In this manner, when the semi-rigid fibrous bodies 502 and 504 are joined, mechanical alignment at the joint is more easily achieved via a self-alignment via the action between the alignment tabs 508 and 510 and their corresponding cutout 512 and 514.

FIG. 6 illustrates the single joined semi-rigid fibrous body 500 of FIG. 5 but in a joined/closed state. As illustrated, when in a closed state, a flat aesthetically pleasing exterior surface is formed with a seam 514 between the two semi-rigid fibrous bodies 502 and 504.

FIG. 7 illustrates a perspective lengthwise cross-sectional view of the joined semi-rigid fibrous body 500. As mentioned above, this view better illustrates cuts made to the attachment member 506 and how the attachment member 506 joins the semi-rigid fibrous bodies 502 and 504. Attachment portions 516 and 518 illustrate portions of the attachment member 506 that are joined with the bodies 502 and 504. In the illustrated embodiment, bodies 502, 504, and attachment member 506 are three separate semi-rigid fibrous bodies. As illustrated, the attachment member 506 is joined to body 502 by sewing/boding at attachment portion 516, and the attachment member 506 is joined to body 504 by sewing/boding at attachment portion 518.

FIG. 7 further illustrates cuts for creating living hinges 520 and 522 on attachment member 506. Living hinge 520 is formed from a first set of "V" cuts 524 and 526, and living hinge 522 is formed from a second set of "V" cuts 528 and 530. When living hinges 520 and 522 are folded to their respective mechanical limits, the semi-rigid fibrous bodies 502 and 504 are joined as described and shown in FIGS. 5 and 6.

In an alternative embodiment, living hinges 520 and 522 may be formed from single respective partial through cuts in place of the set of "V" cuts 524 and 526 and the set of "V" cuts 528 and 530. In this alternative embodiment, when the partial through cuts are folded to their mechanical limit, the semi-rigid fibrous bodies 502 and 504 are joined as described and shown in FIGS. 5 and 6.

In a further alternative embodiment, where the bodies 502 and 504 and the attachment member 506 are all made from a single panel of semi-rigid fibrous panel, attachment portions 516 and 518 may be partial through cuts rather than locations where the bodies 502 and 504 and the attachment member 506 are sewn/bonded together. In this embodiment, the partial through cuts form living hinges 516 and 518. Similar to the above described embodiment, the additional cuts further include living hinges 520 and 522, which may be either a combination of "V" cuts or partial through cuts as described above.

With respect to the embodiment shown in FIGS. 5-7, when used in tandem with additional "V" shaped reliefs and/or partial depth incisions enable construction of a 3-dimensional closed profile with a hidden exterior seam. This 3-dimensional structure is capable of providing structure for a multitude of uses, such as holding LED lights. Such a structure is similar to that discussed in reference to FIGS. 4*a*-4*c* discussed above and will not be repeated here for the sake of brevity. Additionally, the 3-dimensional structure is capable of being flattened when the joined bodies are in an open state. Specifically, a 3-dimensional closed profile body may be flattened via the living hinges, and, when actuated to their fullest extent, a width of the 3-dimensional closed profile body is minimized by a considerable degree.

As used herein, semi-rigid fibrous panel may be made from sew-able substrates and may be any sew-able fibrous body capable of being sewn to another similar such material. For instance, sew-able substrates may include non-woven felts (e.g., architectural acoustic panels and PET), soft plastics/rubbers, foams of varying density whether synthetic or natural, or any other such similar material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A semi-rigid fibrous structure comprising:

a first semi-rigid fibrous body comprising a first living hinge that comprises a v-shaped groove formed by a partial depth incision into the first semi-rigid fibrous body;

a second semi-rigid fibrous body comprising a second living hinge comprising a v-shaped groove formed by a partial depth incision into the second semi-rigid fibrous body; and a rotatable joint formed at a bond between the first semi-rigid fibrous body and the second semi-rigid fibrous body proximate the first living hinge and the second living hinge.

2. The semi-rigid fibrous structure of claim 1, wherein the rotatable joint is in either an open or a close state.

3. The semi-rigid fibrous structure of claim 2, wherein when the rotatable joint is in a closed state, an outside surface of the semi-rigid fibrous structure is flat.

4. An acoustic lighting fixture comprising:

a first semi-rigid fibrous body comprising first and second living hinges each comprising a v-shaped groove formed by a partial depth incision into the first semi-rigid fibrous body;

a second semi-rigid fibrous body comprising third and fourth living hinges each comprising a v-shaped groove formed by a partial depth incision into the second semi-rigid fibrous body;

a first rotatable joint between the first living hinge of the first semi-rigid fibrous body and the third living hinge of the second semi-rigid fibrous body; and a second rotatable joint between the second living hinge of the first semi-rigid fibrous body and the fourth living hinge of the second semi-rigid fibrous body.

5. The acoustic lighting fixture of claim 4, wherein the first rotatable joint and the second rotatable joint can be in a close or an open state.

6. The acoustic lighting fixture of claim 5, wherein when the first rotatable joint and the second rotatable joint are in a closed state, an outside surface of the acoustic lighting fixture is flat and the first rotatable joint and the second rotatable joint are obscured.

7. A semi-rigid fibrous structure comprising:

a first semi-rigid fibrous body;

a second semi-rigid fibrous body; and an attachment member formed at a bond between the first semi-rigid fibrous body and the second semi-rigid fibrous body, wherein the attachment member comprises a plurality of living hinges each comprising a v-shaped groove formed by a partial depth incision into the attachment member.

* * * * *